United States Patent [19]

Kammuri et al.

[11] 4,439,456

[45] Mar. 27, 1984

[54] PROCESS FOR PRODUCING FIBROUS FOOD PRODUCTS

[75] Inventors: Youichi Kammuri; Takafumi Yamauchi; Toshikatsu Takahashi, all of Hachioji, Japan

[73] Assignee: Nippon Suisan Kabushiki Kaisha, Tokyo, Japan

[21] Appl. No.: 330,893

[22] Filed: Dec. 15, 1981

[51] Int. Cl.$^3$ ............................................. A23J 3/00
[52] U.S. Cl. ................................... 426/276; 426/574; 426/643; 426/646; 426/516; 426/802
[58] Field of Search ............... 426/276, 802, 516, 643, 426/574, 646

[56] References Cited

U.S. PATENT DOCUMENTS

| | | | |
|---|---|---|---|
| 2,730,447 | 1/1956 | Boyer | 426/276 X |
| 3,210,195 | 10/1965 | Kjelson et al. | 426/802 X |
| 3,493,391 | 2/1970 | Pottie | 426/643 |
| 3,903,315 | 9/1975 | Giles et al. | 426/516 X |
| 3,987,213 | 10/1976 | Hawkins | 426/802 X |
| 4,060,642 | 11/1977 | Suzuki | 426/802 X |
| 4,239,784 | 12/1980 | Guiraud et al. | 426/802 X |
| 4,303,688 | 12/1981 | Shimura et al. | 426/643 X |

*Primary Examiner*—Robert A. Yoncoskie
*Attorney, Agent, or Firm*—Koda and Androlia

[57] ABSTRACT

A fibrous food product is produced by the steps of: adding salt to fish and/or animal meat; kneading the resulting mixture to prepare a paste; and extruding the paste into an aqueous solution of a protein modifier through a nozzle having fine orifices to produce filaments. By varying the conditions of this process, the food filaments of various textures or mouth feeling can be produced. Further, the filaments can be aggregated in a variety of ways to further increase the variety of textures or mouth feeling and to produce various muscle-like fibrous food products.

4 Claims, 2 Drawing Figures

PROCESS FOR PRODUCING FIBROUS FOOD PRODUCTS

BACKGROUND OF THE INVENTION

The present invention relates to a process for producing novel fibrous food products from fish and/or animal meat.

In recent years, various attempts have been made to produce fibrous food products from various edible protein materials by spinning them into fibers or filaments. Some of these attempts have been put to practical use for industrial purposes. For example, with their advantage of abundant sources of supply, vegetable protein materials such as soybean or wheat protein have begun to be utilized as fibrous food products prepared by spinning these protein materials into filaments and by converting the filaments into several kinds of palatable food products. In this connection, originating in R. A. Boyer, U.S. Pat. Nos. 2,682,466 and 2,730,447, there have been proposed various wet and dry spinning processes such as an alkali dope process resembling a viscose process for producing artificial silk (rayon), wherein soybean protein is dissolved in an alkaline solution and the resulting dispersion is extruded into an acid coagulating bath through a spinneret, and an extrusion process resembling an extrusion process for producing shaped plastics, wherein soybean protein is extruded into filaments through the use of an extruder. Some of these spinning processes have reached the stage of practical use.

On the other hand, in attempts to produce fibrous food products from animal protein materials such as fish meat or animal meat, there have also been proposed various wet and dry spinning processes as is the case with the above mentioned vegetable protein materials. However, none of these proposals have been put to practical use as yet. The reasons therefor are considered to be that: animal protein materials are more expensive then vegetable protein materials, and, thus, the former is inferior to the latter in respect of supply of raw material; the production process is complicated; a high degree of technology is required; a high quality of protein material is required; and the control of quality of the final product is difficult. Thus, in the present state of the art, there is an urgent demand for the development of a process for producing fibrous food products from animal protein materials by spinning them efficiently and conveniently.

The filaments produced from the vegetable protein materials by the Boyer process and the like may be cooked as they are, or they may be converted into meat analogues by bonding them into meat blocks with the use of a binder such as casein.

On the other hand, with regard to animal protein materials, not even filaments produced therefrom are being utilized at present for practical purposes, much less meat blocks produced by bonding such filaments with the use of a binder.

Under these circumstances, if filaments efficiently produced from animal protein materials can be assembled into a fibrous mass from which a block-like fibrous product can be produced without using any binder, the utility value of the animal protein materials can be expected to be greatly increased.

SUMMARY OF THE INVENTION

Thus, a primary object of the present invention is to provide a process for efficiently producing a fibrous food product having muscle fiber-like fine, flexible and elastic texture and excellent flavor from fish and/or animal meats, which process is quite different from the conventional processes.

A second object of the present invention is to provide a process for efficiently producing muscle-like fibrous food products by assembling or aggregating the filaments produced by the above stated process without using any binder.

The present invention provides a process for producing a fibrous food product which comprises the steps of: adding salt to fish and/or animal meat; kneading the mixture to prepare a paste; and extruding the paste into an aqueous solution of a protein denaturing agent through a nozzle having fine orifices to produce filaments.

Furthermore, the present invention provides a process for producing block-like fibrous food products by heating the filaments, preferably, in the form of an aggregate, produced from the fish and/or animal meat by the above described process.

BRIEF DESCRIPTION OF THE ILLUSTRATION

In the illustration:

FIG. 1 is a photomicrograph, of a magnification of 30×, of a cross section of a muscle-like fibrous food product obtained in Example 7 set forth hereinafter, which cross section is perpendicular to the direction of the fibers; and FIG. 2 is a photomicrograph, of a magnification of 15×, of a section of the same food product in a plane parallel to the direction of the fibers.

DETAILED DESCRIPTION OF THE INVENTION

Figure 2:

In the process of the present invention, various types of fish and animal meats can be used as raw material. Among the fish meats usable for the present invention, there are various white meats such as Alaska pollack, flatfish, red meats such as mackerel, and sardine; crustacean meats such as shrimp and krill; mollusk meats such as cuttlefish and clam; various other meats such as whale, and fine meats in the form of ground meat "surimi" or minced meat "otoshimi" which is ordinarily fresh or thawed after freezing. Typical animal meats usable for the present invention are those of domestic animals such as cattle, hogs, horses, sheep and chickens. The animal meat is usually used in the form of minced meat.

These fish and animal meats may be used singly or in mixtures of two or more thereof. In this case, the fish meats may be used singly or in mixtures of two or more of the fish meats. Similarly, the animal meats may be used singly or in mixtures of two or more of the animal meats. Alternatively, mixtures of two or more of at least one of the fish meats and at least one of the animal meats may be used. The material selected is suitably variable depending on the use and the texture of the final product.

Salt is added to the above mentioned fish and/or animal meat, and the resulting mixture is kneaded to prepare a paste. The addition of salt and the subsequent kneading of the resulting mixture cause the salt-soluble proteins in the raw meat to be dissolved out, thereby providing a viscous paste. This paste can be continuously spun without causing breakage of the resulting filaments. The quantity of the salt added is in the range of from 1 to 10%, preferably, from 2 to 4%, based on the weight of the raw meat. The kneading may be carried out by means of a conventional device usually used for the production of fish paste products such as, for example, a food cutter or a grinder.

When salt is added to the meat and the resulting mixture is kneaded, various auxiliary material and food additives may be added, if necessary. Examples of such auxiliary material and additives are starches such as corn starch, wheat flour, and potato starch; various chemical and natural seasonings such as sodium glutamate; spices; essences; dyes; oils and fats; and vegetable proteins. These auxiliary materials may be suitably selected depending on the intended texture and properties of the final product. In order to obtain a high content of oil in the final product, vegetable or animal oils and fats such as salad oil, soybean oil or lard may be used. These auxiliary materials may be added to the raw meat in a quantity of about 30% based on the weight of the raw meat.

The paste obtained by kneading the mixture consisting of the raw meat, salt and, if necessary, one or more food additives is preferably deaerated in a vacuum mixer. Such deaeration procedure serves to provide a homogeneous paste. Then, the deaerated paste is extruded, under pressure if necessary, into a coagulating bath through a nozzle having fine orifices. It is preferable that the nozzle used is a nozzle made of a metal and having fine orifices each of a diameter of 1 mm or less, preferably, from 0.05 to 0.7 mm.

The nozzle used ordinarily has a plurality of fine orifices. The orifices may have a combination of various cross-sectional profiles such as circles and ellipses and various sizes.

The paste is extruded into a coagulating bath, i.e., an aqueous solution of a protein denaturing agent through the nozzle. Examples of preferable aqueous solutions of protein denaturing agents usable for the present invention are an aqueous solution of an alum, an aqueous solution of ethyl alcohol, an aqueous mixed solution of sodium chloride and at least one acid, and an aqueous solution of tannin and an aqueous solution of nicotinic acid. The aqueous solution of a protein denaturing agent, which will be described more fully hereinafter, is ordinarily used at room temperature. It may also be heated and used, if necessary.

When the paste is extruded into the aqueous solution through the nozzle, the protein of the peripheral surface of the resulting filamentary extrudates is ordinarily coagulated due to denaturation in one second to three minutes, whereby filaments are obtained. When hard protein filaments are desired, they can be produced by a longer period of immersion in the aqueous solution. In addition, it is possible to control the degree of denaturation of the protein and the strength of the resulting filaments by adjusting various conditions such as the size of the nozzle, the extrusion pressure, the type of the protein denaturing agent, the concentration and the temperature of the aqueous protein denaturing agent solution and the immersion time in the aqueous solution.

The salted paste prepared from the fish and/or animal meat often contains contaminants such as pin bones, strings, skins and scales. Therefore, it is necessary to remove these contaminants from the paste before it is extruded into the aqueous protein denaturing agent solution. However, even if the paste is filtered through a metal screen such as those used in the conventional processes, the screen itself is liable to suffer from clogging. If the spinneret is provided with a cutter rotating in close contact with the inner surface thereof, the contaminants can be removed by cutting or scraping them by means of the cutter. As a result of this, the spinning operation can be continuously carried out for a long period of time without any clogging.

In this manner, the present invention can produce desired fibrous protein food products by extruding the paste into the aqueous protein denaturing agent solution through the fine orifices and coagulating the filamentary extrudates therein and, if necessary, washing the coagulated filaments with water. In this case, the filament food products can be obtained by directly extruding the paste obtained from the fish and/or animal meat into the aqueous protein denaturing agent solution thereby to coagulate the filamentary extrudates therein. Therefore, it is unnecessary to refine the purity of the protein material to be extruded to a high level and to dissolve the protein material with a strong alkaline agent as is necessary in the case of the conventional processes. Accordingly, the process of the present invention can produce filament food products very conveniently and efficiently.

As described hereinabove, by extruding the paste into the aqueous protein denaturing agent solution thereby to coagulate the filamentary extrudates therein, excellent filament food products can be obtained. Also, by washing the filaments coagulated due to denaturation in the aqueous solution with water and by heating the washed filaments thereby to further coagulate the filaments due to heat denaturation, if necessary, excellent fibrous food products can be obtained. The heating can be ordinarily carried out by boiling, steaming, high frequency heating, or any other continuous or batch type heating. Excellent fibrous food products can be obtained by both non-heating denaturation merely using the aqueous protein denaturing agent solution and the denaturation using the aqueous solution and heating.

The above described heating operation may be applied to a single filament. However, in general, the heating operation is applied to a plurality of filaments in spaced-apart state. Alternatively, when a plurality of filaments are substantially wholly or partially assembled into an aggregate, which is heated so as to bond wholly or partially the filaments thereof while maintaining their original filament form, an interesting muscle-like fibrous food product can be produced. As is described hereinafter, if the aggregate of the filaments is wholly heated, a wholly muscle-like meat block product in the form of a stick, a slice, or minced meat and in which each filament retains its original filament form can be obtained. It the aggregate of the filaments is partially heated, e.g., a suitable number of the filaments in the aggregate or a suitable portion of the filaments in the aggregate is heated, fibrous food products in which the filament portion and muscle-like block meat portion whose filaments retain their original filament form are present in mixed stete, i.e., flake-like meat products, are obtained.

Furthermore, by adjusting the degree of protein denaturation by adjusting the various treatment conditions in the aqueous protein denaturing agent solution, and, in the subsequent assembling and binding process, by binding the fibers as a whole, it is possible to produce muscle-like meat blocks, or, by binding the fibers partially, to produce flake-like meat, or to produce single filaments.

In the heating operation, bundles consisting of a certain number of filaments having a certain length are ordinarily wholly or partially assembled and the resulting assembly is wrapped with an air-permeable film such as cellophane, or it is packed in a bag made of a plastic film while deaeration is carried out. Alternatively, the assembly is placed in a retainer made of a metal. Then the assembly thus enclosed is heated by means of hot water, steam, or microwaves according to a continuous or batch process. Alternatively, the assembly may be continuously heated by the above mentioned heating means while the assembly is passed through rolls. This heating procedure permits the filaments of the assembly to be united and fused with each other without the use of a binder.

The fibrous food products obtained by the above described spinning and aqueous solution immersion procedures or the muscle-like fibrous food products obtained by the heat denaturation of the bundle of the filament products are cut to provide products having a suitable length. Particularly, when the flake-like food products are produced by partially bonding the filaments of the aggregate, it is preferable that the aggregate be cut to a length of from about 0.5 to 3 cm by means of a cutter, a chopper or a slicer before or after the heat denaturation thereof. This operation is effective for providing more flake-like food products because an external force applied during the cutting causes the group of the filaments to be bonded with each other or to be separated from each other while the filament portions of the aggregate are fused with each other in the heating process.

Figure 1:
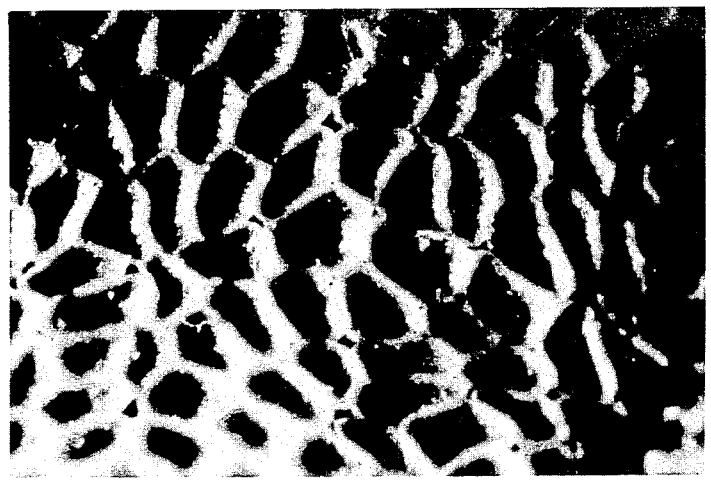

FIGS. 1 and 2 are photomicrographs illustrating a cross-section perpendicular to the filament direction and a section in a plane parallel to the filament direction of the muscle-like fibrous food product obtained by assembling the filaments and bonding them with each other. As is apparent from these photomicrographs, in the food product obtained by the process of the present invention, the degree of denaturation of the protein is different between the peripheral surface portion and the internal portion of the filament, and the neighbouring filaments are integrally bonded with each other so as to form a block consisting of bundles of the filaments while the individual filaments retain their original form and nature as filaments. Because of the difference in the degree of denaturation of the protein between the peripheral surface portion and the internal portion of the filament, the muscle-like block product prepared from such filaments represents a photomicrograph closely resembling that of the fish and/or animal meat.

Accordingly, when the block product is eaten, it exhibits a fibrous texture and a good mouth feeling. Even a product prepared by kneading fine fish meats such as Alaska pollack or mackerel exhibits a fibrous muscle-like texture resembling that of fish meat, animal meat, crab meat, or scallop meat and not that of Neriseihin such as Kamaboko. The assembling and bonding of the filaments according to the present invention may be carried out not only in one direction, but also in multiple directions. The assembling and bonding direction may be optionally selected.

As described hereinabove, the first embodiment of the present invention comprises extruding the paste prepared from the fish and/or animal meat into the aqueous protein denaturing agent solution through the nozzle having fine orifices thereby to prepare filaments and, if necessary, heat treating the resulting filaments. The second embodiment of the present invention comprises assembling the filaments into an aggregate and heat treating wholly or partially the aggregate thereby to bond the filament portions thereof heated with each other. Both in the first embodiment and in the second one, excellent fibrous food products and block-like fibrous food products can be respectively obtained. The above mentioned aqueous protein denaturing agent solution is usually selected depending on the above mentioned first and second processes. In the case of the first embodiment, ordinarily, aqueous solutions of alums, ethyl alcohol or a mixture of sodium chloride and at least one acid are respectively used. In the case of the second embodiment, one or more of aqueous solutions of tannins, nicotinic acid, ethyl alcohol and a mixture of sodium chloride and at least one acid are generally used.

The aqueous protein denaturing agent solutions will now be described in detail. Examples of the alum used are conventional potassium alum, ammonium alum and burned alum. In the first embodiment, the concentration of the alum in the aqueous solution is in the range of from 0.1 to 10% by weight, preferably, from 0.5 to 5.0% by weight. An aqueous solution of ethyl alcohol may be used in both the first embodiment and the second one. In the case of the first embodiment, the concentration of ethyl alcohol in the aqueous solution is relatively lower than that conventionally used for dehydration or defatting, i.e., in the range of from 40 to 80% by weight. In the case of the second embodiment, the concentration of ethyl alcohol in the aqueous solution is 59% by weight or less, preferably, in the range of from 10 to 40% by weight.

A mixed aqueous solution of sodium chloride and an acid may also be used in both the first embodiment and the second one. The concentration of sodium chloride is 15% by weight or more. The acid for the aqueous solution may be selected from inorganic acids such as hydrochloric acid and phosphoric acid and organic acids such as acetic acid and citric acid and vinegar. The pH of the mixed aqueous solution is suitably in the range of from 3.0 to 5.5. Particularly, in the case of the second embodiment, the pH of the mixed aqueous solution is preferably in the range of from about 4.0 to about 5.0. The above mentioned acid is used in a concentration suitable to maintain the pH of the mixed aqueous solution within the above mentioned range. If necessary, buffer agents such as sodium acetate, sodium citrate and sodium secondary phosphate and alkaline agents such as sodium hydroxide may be added to the aqueous solution so as to adjust the pH thereof to the desired value.

As the tannins, use may be made of all tannin-containing substances naturally occurring such as tannic acid, tannin, persimmon tannin and tea incrustations. In the second embodiment, tannins are generally used in a concentration of from 0.1 to 20% by weight, preferably from 0.5 to 5.0% by weight, in terms of tannic acid. Nicotinic acid is used in a concentration of from 0.2 to 10% by weight, preferably, from 0.5 to 1.5% by weight, in the second embodiment.

If the concentration of the protein denaturing agent and the pH of the aqueous solution are outside the above stated respective ranges, the protein of the filament cannot be denatured to a satisfactory extent, whereby the production of filaments having proper physical properties and texture will become difficult, or the resulting filament will have a too hard and fragile texture or will exhibit a poor taste, or, when the filaments resulting from coagulation in such an aqueous solution are converted to block-like or flake-like fibrous food product, the bonding strength of the filaments to each other will become low. Therefore, it is desirable that the above stated concentration limits and pH limits be observed.

As will be apparent from the foregoing, in accordance with the process of the present invention, the muscle-like fibrous food products are obtained by converting the fish and/or animal meat into filaments by spinning, or by assembling the filaments into an aggregate and bonding the filaments of the aggregate to each other in such a manner as to provide a desired form of the resulting product.

The process for spinning animal proteins and that for bonding the same of the present invention have a number of advantages including the following over the conventional processes. In the production of the filaments, a paste prepared by kneading a mixture of fish and/or aminal meat and salt and if necessary, an additive can be converted into filaments merely by extruding the paste into a coagulating bath through a nozzle. Therefore, the process for spinning animal proteins is simple and efficient. In order to obtain flavored and/or dyed filaments, additives such as seasonings, dyes and oils and fats can be added to the starting material before the spinning operation. Moreover, there is almost no flowing out or loss of the additive components during the subsequent spinning operation. Furthermore, the presence of the additives does not interfere with the spinning operation. Further, the spinning operation requires no neutralization. In addition, at least in the spinning operation, heating is not always necessary. Therefore, a reduction in labor and energy is possible. The process for spinning animal proteins makes possible the production of filaments having a diameter of 1 mm or less and high strength.

Another important feature of the process of the present invention is that if the denaturation coagulation of the filamentary extrudates in the coagulating bath is stopped at a stage of partial denaturation, the subsequent bonding of the filaments of a filament aggregate can be accomplished merely by heating the aggregate without the use of a binder. Therefore, it is possible to produce a meat block closely resembling animal muscles and having neither a foreign taste and odor nor incompatible texture. In contrast, when a binder is used, the binder-bonded portions of the resulting meat block exhibit a foreign taste and odor and an incompatible texture.

Furthermore, by suitable adjustment of various spinning conditions such as the type, the concentration and the temperature of the coagulating bath, aqueous protein denaturing agent solution and the residence time therein, the size of the nozzle orifices and the extrusion pressure, i.e., the size of the filament, it is possible to freely control the degree of denaturation of the protein of the resulting filament and the strength and texture of the resulting filament and block meat and to attain enhanced efficiency of the bonding operation. In addition, by a suitable selection of the raw material and the type and the proportion of the additives, it is possible to obtain products having various textures, flavors and properties. The spinning operation and the bonding operation can be carried out on a continuous basis.

As is described hereinabove, in accordance with the process of the present invention, by spinning the animal protein into the form of fine filaments or by assembling the fine filaments into an aggregate and bonding the filaments of the group, block-like fibrous food products having excellent texture which could not be expected from the raw proteins and excellent quality can be produced with good workability.

In order to indicate more fully the nature and utility of this invention, the following specific examples of practice thereof and comparative examples are set forth, it being understood that these examples are presented as illustrative only and are not intended to limit the scope of the invention.

EXAMPLE 1

Salted meat pastes (A) and (B) were prepared by adding 2.5% by weight of sodium chloride to ground meat of Alaska pollack. Separately, an alkali dissolved meat (C) was prepared by adding 1.5% by weight of a 20% sodium hydroxide solution to ground meat of Alaska pollack so as to bring the pH of the meat to 10.5. 2% by weight of a chemical seasoning was added to each of these meats (A), (B) and (C).

Each of the meats (A), (B) and (C) was extruded through a nozzle having an orifice diameter of 0.5 mm. The resulting extrudate was coagulated, washed with water and heated under the conditions as indicated in Table 1, thereby to prepare a fibrous product.

TABLE 1

| Sample | | Treatment Conditions |
|---|---|---|
| A | Salted meat paste | Coagulation in a 1% aqueous solution of potassium alum → Boiling at 95° C. for 3 min. → Draining. |
| B | Salted meat paste | Coagulation in hot water at a temperature of 95° C. for 3 min. → Draining |
| C | Alkali dissolved meat | Coagulation in an aqueous solution containing 1% by weight of acetic acid, 0.3% by weight of sodium acetate and 5% by weight of sodium chloride and having a pH of 3.9 → Washing with water → Boiling at 95° C. for 3 min. → Draining. |

The qualities of the products are shown in Table 2. The product A according to the process of the present invention had an appropriate hardness, a satisfactory elasticity, a desirable mouth feeling and a favorable flavor, while the texture of the product B felt too soft and non-fibrous, and the product C exhibited inferior texture and felt dry and crumbling and was flavorless.

TABLE 2

| Fibrous product | Mouth feeling | Flavor | Tensile strength (g) |
|---|---|---|---|
| A | Appropriate hardness, satisfactory elasticity, desirable mouth feeling | excellent | 23 |
| B | Too soft, non-fibrous | good | <1 |
| C | Hard, dry and crumbling | flavorless | 41 |

The tensile strength was determined by using a rheometer made by Fudo Kogyo K.K. of Japan, in accordance with the following method. A bundle of eight fibrous products was grasped by an adapter in such a manner as to provide a 2 cm length of the bundle. The bundle was then pulled at a traveling speed of 20 cm/min. of a sample table. The stress in g per one fibrous product under which the bundle broke was measured to obtain the tensile strength of the sample. The correlation between the tensile strength and the organoleptic test result of the fibrous product is shown in Table 3.

TABLE 3

| Tensile strength (g) | Mouth feeling according to organoleptic test |
|---|---|
| <5 | soft, low fibrous |
| 5–15 | slightly soft, appropriately fibrous, preferable |
| 16–35 | slightly hard, highly fibrous, preferable |
| 35< | hard, extremely highly fibrous, poor |

EXAMPLE 2

3 kg of sodium chloride was added to 100 kg of minced meat of Alaska pollack. The meat was kneaded in a vacuum silent cutter. The resulting meat paste was extruded under pressure into a 1.5% aqueous solution of potassium alum through a nozzle made of gum metal and having a plurality of orifices each having a diameter of 0.6 mm. After the fibrous extrudates were immersed in the coagulating solution for 100 seconds, the coagulated extrudates were washed with water and cut. Thus, 98.5 kg of a fibrous food product was obtained. The resulting fibrous product was a crab meat-like fiber having a beautiful white color. This product was mixed with a salad. The resulting salad was subjected to an organoleptic test by a panel consisting of 22 persons. The results are shown in Table 4. As is clear from Table 4, the mouth feeling of the product was found to be the same as that of a commercially available crab salad.

TABLE 4

| | Persons having a preference |
|---|---|
| Commercially available crab salad | 12 |
| Salad containing the fibrous food product of the present invention | 10 |

EXAMPLE 3

Four types of salted pastes were prepared by kneading raw materials each having the formulation as indicated in Table 5 in a food cutter and deaerating the kneaded materials in a vacuum mixer.

TABLE 5

| Material ingredient | Formulation of raw material, (%) | | | |
|---|---|---|---|---|
| | A | B | C | D |
| Ground meat of Alaska pollack | 40 | 70 | — | 60 |
| Minced meat of mackerel | 30 | 26 | — | — |
| Minced pork | — | — | 40 | — |
| Minced mutton | — | — | 50 | 30 |
| Isolated soybean protein | 10 | — | — | 3 |
| Corn starch | 3 | — | — | 3 |
| Soybean oil | 14 | — | 6 | — |
| Edible dye | 0.5 | 0.7 | — | 0.5 |
| Seasoning | 0.5 | 0.5 | 0.5 | 0.9 |
| Sodium chloride | 2.0 | 2.8 | 3.5 | 2.6 |

Each of these pastes was extruded into an aqueous solution of the protein denaturing agent indicated in Table 6 through a nozzle having an orifice of a diameter of 0.5 mm. After the extrudate was allowed to stand in the aqueous solution for 5 minutes, the denatured extrudate was washed with water to prepare a fibrous product. Then, the fibrous product was heated in a heating bath for 5 minutes, after which the heated product was cooled in a cooling bath for 3 minutes. As a control, each of the above mentioned pastes was extruded into hot water having a temperature of 95° C. in a manner as described above. The same heat treatment as described above was applied to the resulting fibrous product. The tensile strength of each product was determined by means of the rheometer. The results are shown in Table 6.

TABLE 6

| | | Tensile strength of filament, (g) | | | | | | | |
|---|---|---|---|---|---|---|---|---|---|
| Aqueous solution of protein denaturing agent | | | | | | | | | |
| Solute | Concentration | Product before heating | | | | Product after heating | | | |
| | | A | B | C | D | A | B | C | D |
| Potash alum | 1% | 7 | 8 | 5 | 6 | 18 | 21 | 13 | 14 |
| Ethyl alcohol | 50 | 20 | 21 | 14 | 16 | 18 | 20 | 13 | 14 |
| Sodium chloride | 20 | | | | | | | | |
| Acetic acid | 1 | 31 | 35 | 22 | 25 | 27 | 33 | 19 | 22 |
| Sodium acetate | 0.3 | | | | | | | | |
| Sodium chloride | 16 | 30 | 33 | 22 | 24 | 26 | 28 | 18 | 21 |
| Citric acid | 0.3 | | | | | | | | |
| Sodium citrate | 0.5 | | | | | | | | |
| Control (95° C. hot water) | 0 | — | — | — | — | 1.5 | 2 | 1 | 1 |

Note:
Symbol (—) denotes that determination was impossible.
The pHs of the solutions 3 and 4 were 3.5 and 3.8, respectively.

The non-heated filament products and the heated filament products of the present invention all had a desirable texture, i.e., an appropriate resistance to the teeth, while the control product had a non-fibrous and soft texture.

EXAMPLE 4

The meat paste A as prepared in Example 3 was extruded into a 2% aqueous solution of burnt alum having a temperature of 30° C. through a plate having 100 orifices each of a diameter of 0.3 mm. The extrudates were immersed in the aqueous solution for 30 seconds. At the end of that time, the coagulated extrudates were removed from the solution and washed with water, thereby to prepare non-heated fibrous products.

Some of the fibrous products were heated in boiling water for 3 minutes.

The non-heated product and the heated product were roughly ground by means of a chopper. A canned corned beef-like product was prepared by using each ground product according to the formulation as indicated in Table 7. The resulting cannned product closely resembled a commercially available canned corned beef prepared from beef. The results of the organoleptic test on these canned products are shown in Table 8. Both the texture and the flavor of the corned beef-like canned products were substantially equivalent to those of the commercially available canned corned beef.

TABLE 7

| Formulation of canned corned beef-like product, (%) | | |
|---|---|---|
| Material | I | II |
| Non-heated fiber | 70 | — |
| Heated fiber | — | 70 |
| Refined beef tallow | 24 | 24 |

TABLE 7-continued

| Formulation of canned corned beef-like product, (%) | | |
|---|---|---|
| Material | I | II |
| Sugar | 3 | 3 |
| Seasoning | 2 | 2 |
| Spice | 0.5 | 0.5 |
| Emulsifying agent | 0.5 | 0.5 |

TABLE 8

Result of organoleptic test
(evaluated by a ten-point method)

| Sample | Appearance | Texture | Flavor |
|---|---|---|---|
| Sample I of this invention | 7 | 8 | 8 |
| Sample II of this invention | 8 | 9 | 8 |
| Commercially available canned corned beef | 8 | 8 | 7 |

EXAMPLE 5

2 kg of sodium chloride and 1 kg of a flavoring material were added to 100 kg of ground meat of Alaska pollack. The mixture was kneaded in a food cutter to prepare a paste. The paste was extruded into a 2% aqueous solution of tannic acid through a nozzle made of glass and having a plurality of spinning orifices each of a diameter of 0.4 mm. After the extrudates were caused to travel through the coagulating solution for 30 seconds, they were taken up by a roll while being bundled. The fibrous bundle was heated in a steam box for 10 minutes while being lightly pressed by means of rolls, thereby to obtain 101 kg of a stick-like fibrous meat block having a thickness of 10 mm. The block was cut to obtain a product having a length of 8 cm. The resulting product and a commercially available crab limb Kamaboko were subjected to an organoleptic test by a pair test. The results are shown in Table 9. As is apparent from Table 9, the panel members had a significant preference for the product of the present invention rather than the commercially available Kamaboko.

TABLE 9

| | Persons having a preference |
|---|---|
| Commercially available crab limb Kamaboko | 1 |
| Product of this invention | 19 |

EXAMPLE 6

Four types of salted meat pastes were prepared by kneading raw materials each having the formulation as indicated in Table 10 in a food cutter and deaerating the kneaded mass in a vacuum mixer.

TABLE 10

| | Formulation of raw material, (%) | | | |
|---|---|---|---|---|
| Material ingredient | A | B | C | D |
| Ground meat of Alaska pollack | 40 | 70 | — | 60 |
| Minced meat of mackerel | 30 | 26 | — | — |
| Minced pork | — | — | 40 | — |
| Minced mutton | — | — | 50 | 30 |
| Separated soybean protein | 10 | — | — | 3 |
| Corn starch | 3 | — | — | 3 |
| Soybean oil | 14 | — | 6 | — |
| Edible dye | 0.5 | 0.7 | — | 0.5 |
| Seasoning | 0.5 | 0.5 | 0.5 | 0.9 |

TABLE 10-continued

| | Formulation of raw material, (%) | | | |
|---|---|---|---|---|
| Material ingredient | A | B | C | D |
| Sodium chloride | 2.0 | 2.8 | 3.5 | 2.6 |

Each of these meat pastes was extruded into an aqueous solution of the protein denaturing agent described in Table 11 through a nozzle having an orifice of a diameter of 0.5 mm. After a two minute immersion in the coagulating solution, the filament extrudate was removed from the solution and lightly washed with water and finally drained. Thereafter, 50 g of the resulting product was packed in a bag made of a polyvinylidene chloride film. Then, the bag was heated in boiling water for 20 minutes to provide a block-like fibrous product. The state in which the filaments in the product were bonded and the texture of the product are shown in Table 11.

TABLE 11

| Aqueous solution of protein denaturing agent | | Bonded state between fibers A B C D | Texture A B C D |
|---|---|---|---|
| Solute | Concentration (%) | | |
| Tannic acid | 1 | In all products, the bonded filaments maintain their original filament configuration | All products resemble livestock meats |
| Nicotinic acid | 1 | In all products, the bonded filaments maintain their original filament configuration | All products resemble livestock meats |
| Ethyl alcohol | 15 | In all products, the bonded filaments maintain their original filament configuration | All products resemble crab meat and scallop meat |
| Control (water) | — | In all products, the filaments are completely fused with each other | All products resemble Kamaboko |

It is apparent from the results shown in Table 11 that when tannic acid, nicotinic acid or ethyl alcohol is used as the protein denaturing agent, the muscle-like meat mass prepared from each salted meat paste is fibrous and has a good flavor.

EXAMPLE 7

A flavoring material and sodium chloride were added to minced meat of Alaska pollack in amounts of 2% and 3%, respectively, based on the weight of the Alaska pollack minced meat. The mixture was kneaded and deaerated in a vacuum food cutter. The resulting salted meat paste was extruded into a 20% aqueous solution of ethyl alcohol through a plate having 200 orifices each of a diameter of 0.5 mm. After a two minute immersion in the coagulating solution, the filament extrudates were removed from the solution while being taken up by a roll.

After the bundle was washed with water and drained, it was wrapped with cellophane, and the wrapped bundle was boiled in water at a temperature of 95° C. for 10 minutes. The resulting meat block consisted of a bundle in which the filaments were lightly bonded with each other, and had a desirable texture resembling scallops.

EXAMPLE 8

10 kg of a ground meat of Alaska pollack, 5 kg of minced meat of mackerel, 400 g of sodium chloride, 200 g of a seasoning and 1 g of an edible dye were kneaded in a food cutter. The tendons and the like contained in the kneaded meat were removed by means of a fishmeat strainer. The kneaded meat was then deaerated in a vacuum mixer to prepare a salted meat paste. The meat paste was extruded into an aqueous solution containing 0.5% of tannic acid at a temperature of 30° C. through a plate having 200 orifices each of a diameter of 0.3 mm. The filament extrudates were removed in a bundle state from the solution. The extrusion and removal operations were continuously carried out. The coagulation operation was carried out in such a manner as to provide an immersion period of 1 minute in the tannic acid solution. The coagulated bundle was drained and wrapped with a polyethylene film. The wrapped bundle was boiled in water for 30 minutes, thereby to produce 15.2 kg of a meat block in which the filaments were substantially bonded with each other.

The resulting meat block had a structure resembling that of a muscular fiber bundle, and the appearance and the texture both resembled those of livestock meats.

Photomicrographs of a cross-sectional profile of the meat block in a direction perpendicular to the longitudinal direction of the filaments and a sectional profile of the meat block in the longitudinal direction of the filament are shown in FIGS. 1 and 2, respectively. These photomicrographs also indicate that the meat block had a structure resembling that of livestock meats.

EXAMPLE 9

150 g of sodium chloride, 222 g of a seasoning, 10 g of a spice and 200 g of starch were added to 10 kg of minced pork. The mixture was kneaded in a food cutter to prepare a meat paste. The meat paste was extruded into an aqueous solution containing 1% of tannic acid and 0.5% of nicotinic acid through a nozzle made of a metal and having a plurality of fine orifices each of a diameter of 0.3 mm. After the filament extrudates were immersed in the coagulating solution for 5 minutes, they were removed from the solution and lightly washed with water. Then, the coagulated filaments were cut by a chopper to provide short fibers each of a length of about 1 cm.

Then, a rectangular retainer measuring 3×60×60 cm was filled with the short fibers. Thereafter, the retainer was placed in a boiling box and boiled for 30 minutes, thereby to produce 10 kg of a block-like fibrous product in which the short fibers bonded to each other were oriented in a plurality of directions.

The resulting product was sliced by means of a slicer to produce a steak-like product measuring 1×3×5 cm. The steak-like product was coated with batter and bread crumbs and fried. The fried steak-like product had a texture and a flavor which were equivalent to those of a pork cutlet.

EXAMPLE 10

10 kg of a ground meat of Alaska pollack, 3 kg of a krill meat, 400 g of sodium chloride, 100 g of a powdery gluten and 2 kg of potato starch were kneaded and degassed in a vacuum food cutter, thereby to prepare a meat paste. The meat paste was extruded into an aqueous solution containing 20% of sodium chloride, 1.2% of acetic acid and 0.6% of sodium hydroxide through a mixed nozzle having 50 spinning orifices each of a diameter of 0.7 mm, 2 spinning orifices each of a diameter of 1 mm, and 5 ellipsoidal spinning orifices each of a long diameter of 1 mm and a short diameter of 0.5 mm.

After the filament extrudates were immersed in the coagulating solution for 1.5 minutes, the coagulated filaments were assembled so that the thickness of the resulting assembly was 25 mm. The assembly was boiled in water for 10 minutes. At the end of that time, a portion of the surface of the assembly was coated with a liquid containing a red dye, immediately thereafter the dyed assembly was cut by means of a chopper having a plate having an opening of a diameter of 18 mm. Then the cut products were washed in running water for 10 minutes.

The cut products were then mixed with 250 g of a seasoning and 50 g of a crab flavor in a mixer to prepare 16 kg of crab flake-like fibrous food product.

The resulting crab flake-like product was composed of a portion consisting of the filaments bonded to each other and another portion consisting of the individual filaments. Therefore, the product had an appearance entirely similar to that of crab meat. The canned product prepared from these flakes had a good taste equivalent to that of a canned "Zuwaigani" (queen crab) product.

EXAMPLE 11

10 kg of frozen ground meat of Alaska pollack was thawed. 400 g of sodium chloride and 2 kg of potato starch were added to this thawed meat. The mixture was kneaded and degassed in a vacuum silent cutter to prepare a meat paste. The meat paste was extruded under hydraulic pressure into an aqueous solution containing 15% of sodium chloride, 1.5% of acetic acid, and 0.6% of sodium hydroxide and having a pH of 4.7 through a spinning nozzle having 30 spinning orifices each of a diameter of 0.7 mm and 2 ellipsoidal spinning orifices each of a long diameter of 1.5 mm and a short diameter of 0.7 mm.

After being immersed in the coagulating solution for 2 minutes, the coagulated filaments were collected on a net conveyer so that the resulting assembly had a thickness of 20 mm. The assembly was boiled in a boiling box for 10 minutes. Then, a part of the surface of the filament assembly was coated with a red dye, immediately after which the assembly was cut by means of a chopper having a plate having an opening of a diameter of 18 mm. The cut products were washed with water for 15 minutes. The cut products were then placed in a mixer, and 250 g of a seasoning and 600 g of a spice were added thereto. The mixture was thoroughly blended to produce 12 kg of a crab flake-like fibrous food product.

The resulting crab flake-like product and a commercially available crab-like shredded Kamaboko were subjected to a pair test by a panel consisting of 30 persons. The results are shown in Table 12. The panel members had a significant preference for the crab flake-like fibrous product of the present invention at a risk factor of 1%.

TABLE 12

|  | Configuration | Color | Mouth feeling | Flavor |
| --- | --- | --- | --- | --- |
| Persons preferring the product of this | 25 | 26 | 28 | 24 |

TABLE 12-continued

| | Configuration | Color | Mouth feeling | Flavor |
|---|---|---|---|---|
| invention | | | | |
| Persons preferring the commercially available product | 5 | 4 | 2 | 6 |

EXAMPLE 12

500 g of corn starch, 150 g of wheat gluten, and 700 g of soybean oil were added to 5 kg of a cuttlefish meat, which was prepared from limbs of a cuttlefish by peeling their skin with an alkali, and 21 kg of minced meat of Alaska pollack. The mixture was kneaded in a food cutter and then deaerated in a mixer to prepare 8.5 kg of a meat paste.

The meat paste was extruded into a buffer solution of citric acid which was saturated with sodium chloride and had a pH of 4.6 through a spinning orifice of a diameter of 0.5 mm by means of a gear pump. The filamentous extrudate was coagulated in the coagulating solution for 1 minute. Thereafter, the coagulated product was placed in a boiling cage made of a wire net. The product in the boiling cage was boiled for 7 minutes under a pressure of a stone having a weight of 2 kg lying over the product. Immediately after completion of the boiling operation, the boiled product was cut with a food cutter into pieces each of a length of about 12 mm. The cut pieces were washed with water. Thus, 28.3 kg of a scallop flake-like fibrous food product was obtained.

An empty can was filled with the resulting scallop flake-like fibrous product and a liquid was poured thereinto. Then, the can containing the product was deaerated and sealed. The sealed can was sterilized at a temperature of 114° C. for 60 minutes to prepare a canned product.

The resulting canned product and a commercially availale canned scallop flake product were subjected to an organoleptic test according to a pair test. The results are shown in Table 13. As is apparent from Table 13, no significant difference between these products was noted.

TABLE 13

| | Persons have a preference (N = 24) |
|---|---|
| Product of this invention | 11 |
| Commercially available product | 13 |

EXAMPLE 13

30 g of sodium chloride, 100 g of starch, 30 g of white of egg, 30 g of soybean protein, 30 g of wheat protein, and 0.1 g of a coloring matter were added to 1 kg of a raw meat of the Antarctic krill from which the skin was peeled off. The mixture was kneaded in a grinder. The kneaded meat was deaerated in a vacuum mixer to prepare a meat paste. The meat paste was extruded into an aqueous solution of hydrochloric acid containing 20% of sodium chloride and having a pH of 5.0 through a spinning orifice of a diameter of 0.3 mm.

After being immersed in the solution for 1 minute, the coagulated product was wrapped with a wrapper. The wrapped product was boiled in a boiling apparatus for 10 minutes. The boiled product was washed with water for 3 minutes. Thereafter, the washed product was cut into fine pieces each having a thickness of about 8 mm. The fine pieces were boiled in a seasoning liquid for 3 minutes to produce 1.1 kg of a lobster flake-like fibrous food product.

500 g of the resulting lobster flake-like product was mixed with 150 g of a thickener consisting of ground meat of Alaska pollack, and the mixture was shaped into a stick having a thickness of 15 mm and a length of 8 cm. The shaped stick was coated with bread crumbs and frozen at a temperature of −30° C. The frozen stick was fried in an oil at a temperature of 175° C. for 3 minutes. The fried rod had a flavor and a texture which were equivalent to those of conventional fried lobster.

We claim:

1. A process for producing a fibrous food product which comprises the steps of: adding 1–10% sodium chloride to fish and/or animal meat; kneading the resulting mixture to prepare a paste; and extruding the paste into an aqueous solution of a protein denaturing agent through a nozzle having fine orifices to produce filaments.

2. A process as claimed in claim 1, wherein said filaments are further heated to unite and fuse such filaments.

3. A process as claimed in claim 2, wherein said filaments in the form of an assembly are heated.

4. A process as claimed in claim 1, wherein said protein denaturing agent is selected from the group consisting of alums, ethyl alcohol, tannin, nicotinic acid and a mixed aqueous solution of sodium chloride and at least one acid, the concentration of sodium-chloride in said solution being at least 15% by weight.

* * * * *